April 16, 1929. W. V. OSBORNE 1,709,092
BRAKE OPERATING MECHANISM
Filed April 28, 1926
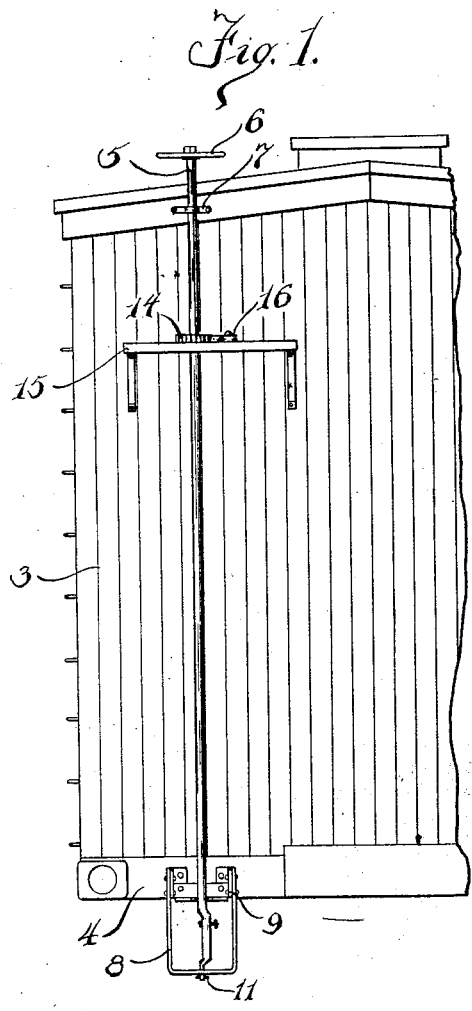
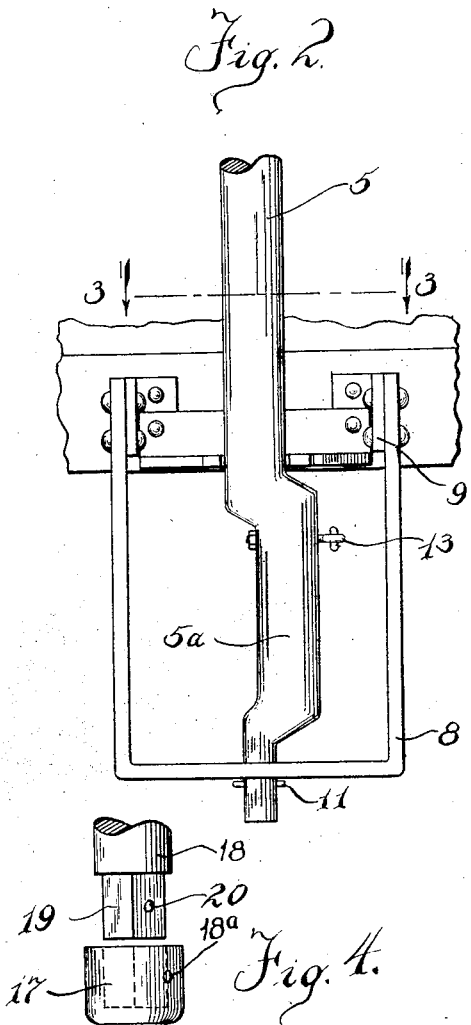
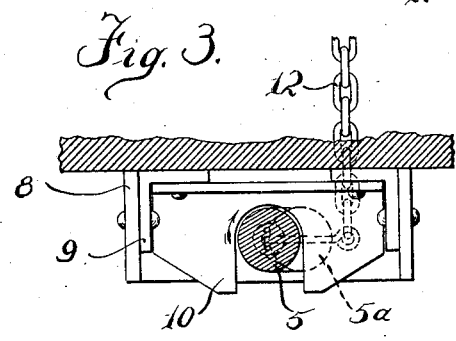
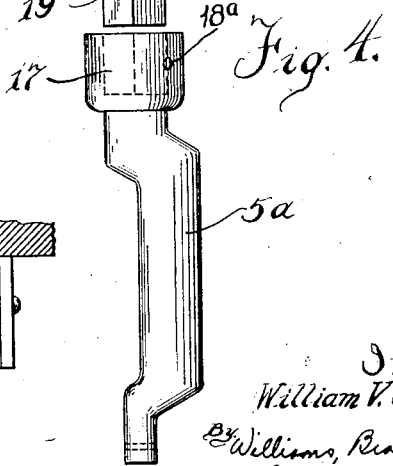
Inventor.
William V. Osborne.
By Williams, Bradbury,
McCaleb & Hinkle
Attorneys.

Patented Apr. 16, 1929.

1,709,092

UNITED STATES PATENT OFFICE.

WILLIAM V. OSBORNE, OF RACINE, WISCONSIN.

BRAKE-OPERATING MECHANISM.

Application filed April 23, 1926. Serial No. 105,044.

My invention relates generally to a railroad freight car hand brake operating means. More particularly my invention contemplates the provision of an improved brake operating rod.

It is an object of my invention to provide an improved railroad freight car brake operating rod which is adapted to easily and quickly take up the slack in the brake operating chain and to exert an increased pull when the slack has been taken up and the brakes are being applied.

A further object is to provide an improved brake rod which is simple in construction and which may be economically manufactured.

Other objects will appear from the following description, reference being had to the accompanying drawings, in which:

Figure 1 is an end elevation of a portion of a freight car showing the means by which the brake rod of my invention may be attached to a box car;

Figure 2 is an enlarged elevation of the lower portion of my improved brake rod;

Figure 3 is a horizontal section of the brake rod and its supporting means taken on a line 3—3 of Figure 2.

Figure 4 is an elevation of a modification of my invention.

As commonly constructed, the brakes of practically all freight cars are adapted to be manually operated by means of a tensional pull upon a chain which is operatively connected to the brake shoes. When the brake is not being used it is, of course, desirable to have the shoes spaced away from the wheels. It therefore is necessary to provide considerable slack in the chain by means of which the brakes are operated. In the use of brake rods as ordinarily constructed, it is thus necessary for the brakeman in applying the brakes to first rotate the brake rod sufficient to take up this slack. A great many devices have been suggested to decrease the amount of rotation required in taking up this slack but few of them have been adopted because of their complicated nature and because of the fact that alterations in the general design of the car would be necessary to make their use feasible.

My improved brake rod may be substituted for the ordinary brake rod without making any material changes in the construction of the car or even in the brake rod supporting means.

As shown in Figure 1, the freight car 3, which is merely illustrative of the usual construction, has a lower sill 4 to which the brake rod supporting means is attached. The brake rod 5, at the top of which the usual hand wheel 6 is fixed, is rotatably secured to the end of the freight car by a bearing bracket 7 at the upper end and at its lower end by means of a U shaped supporting and bearing bracket 8. This bracket is riveted to angle clips 9 which in turn are riveted to the lower end sill of the car. A notched bearing plate 10 is provided to guide and brace the lower end of the brake rod 5. The plate 10 is also riveted to the lower sill 4. A pin 11, or any other suitable means, may be provided to prevent upward movement of the brake rod 5 relative to the support 8. The portion 5ª of the brake rod 5 which extends below the lower edge of the sill is offset as is clearly shown in Figure 2. One end of the chain 12 is connected to the brake actuating mechanism (not shown), the other end being secured to the offset portion 5ª of the brake rod by means of an eye bolt 13.

The usual ratchet wheel 14 is secured to the rod 5 above a small platform 15 and is engaged by a pawl 16 pivotally mounted on the platform. In operating the brakes the brakeman stands upon this platform, so that he can readily not only manipulate the hand wheel 6 but can also kick the pawl from engagement with the ratchet wheel when he wishes to release the brakes.

In the modification of my invention shown in Figure 4, this offset portion is formed as a detachable unit. It is similar in every respect to the above described construction except for the fact that it has a square socket 17 formed directly above the offset portion. This device is adapted to be installed on cars formerly equipped with the usual brake rod, it being necessary merely to saw off the lower end of the old brake rod 18 and square the end 19 so as to fit in the socket 17. The offset portion may be secured to the old brake rod by means of a pin passing through the hole 18ª drilled in the socket and a registering hole 20 in the squared portion of the brake rod.

When the brakes are not applied the offset portion 5ª will be in a position nearest the plane of the end of the car. Upon applying the brakes the brake rod 5 will be rotated in the direction as indicated by the arrow in Figure 3. It will thus be seen that the slack of the chain will be taken up quickly due to the eccentricity of the offset portion 5ª. Practically all of the slack in the chain will be taken up by the time the brake rod has been rotated throug an angle of approximately 180°. Upon further rotation of the brake rod the rate at which the chain is wound upon the offset portion 5ª of the rod will be reduced due to the eccentricity of the portion 5ª. The differential movement, however, will be sufficient to cause the brake rod to exert a continued pull upon the chain. During the entire second half of the revolution of the brake rod the chain will not be wound up as fast as it would if the winding portion of the brake rod were straight. The other correlated effect of the construction of my invention is that during the first part of the rotation of the brake rod the mechanical advantage of the mechanism is low but that it gradually increases during the second half of a revolution so that during the last half of the revolution of the rod a very great force may be exerted upon the brakes. The parts, of course, are preferably proportioned so that the brake may be fully applied by the rotation of the rod through an angle of greater than 180° and less than 360°.

While the form of the brake rod herein shown and described is admirably adapted to fulfill the objects primarily stated, it is understood that it is not intended to confine the invention to the forms of embodiment herein disclosed for it is susceptible of embodiment in various forms all coming within the scope of the claims which follow:

I claim:

1. In a railway freight car brake operating machanism, a chain adapted to actuate the brakes, a rotatably mounted brake rod having a cylindrical eccentric portion adjacent its lower end the surface of said eccentric portion intersecting the projected longitudinal surface of said rod, means for securing one end of said chain to said eccentric portion, and a bearing portion below said eccentric portion and coaxial with said rod.

2. An article of manufacture for improving the action of railway freight car brake rods, comprising a detachable brake rod extension having a socket at one end for making a non-rotatable connection with a brake actuating rod, an eccentric cylindrical portion, and a bearing portion below said eccentric portion and coaxial with said socket.

3. An article of manufacture for improving the action of railway brake operating mechanism, comprising an extension piece having means at one end for making a detachable connection with a brake rod, a bearing portion at the other end coaxial with said means, and an intermediate cylindrical portion eccentric with respect to said means and said bearing portion.

In witness whereof, I hereunto subscribe my name this 17th day of April, 1926.

WILLIAM V. OSBORNE.